(No Model.) 2 Sheets—Sheet 1.
W. THOMSON.
STEERING MECHANISM.
No. 465,896. Patented Dec. 29, 1891.
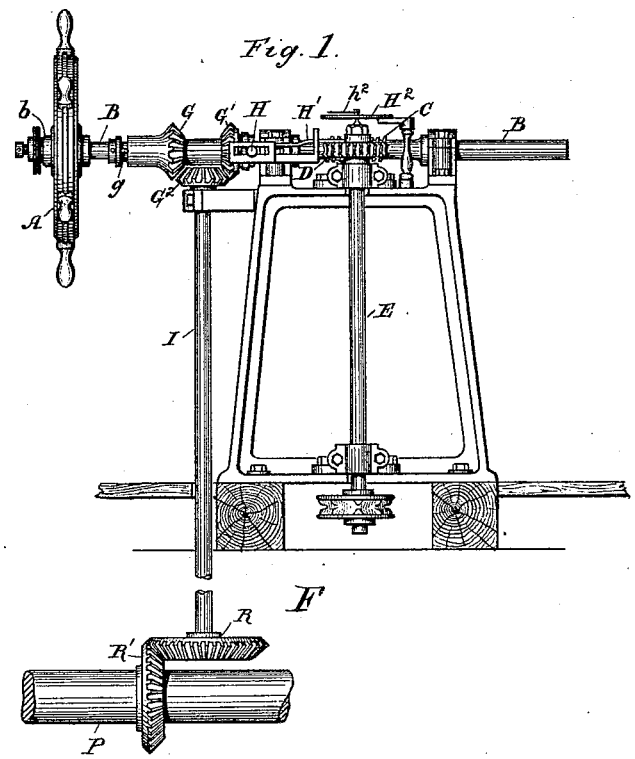
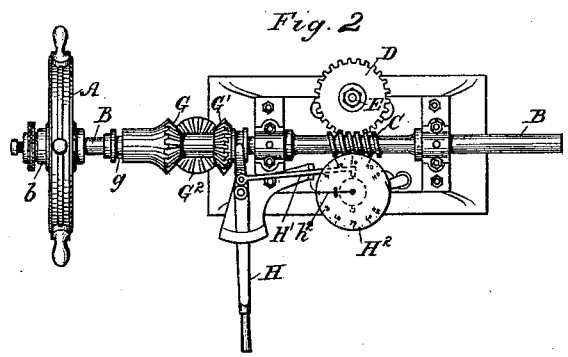
Witnesses:
C. C. Champion
E. L. Richards
Inventor:
William Thomson
By Richards
Attorneys

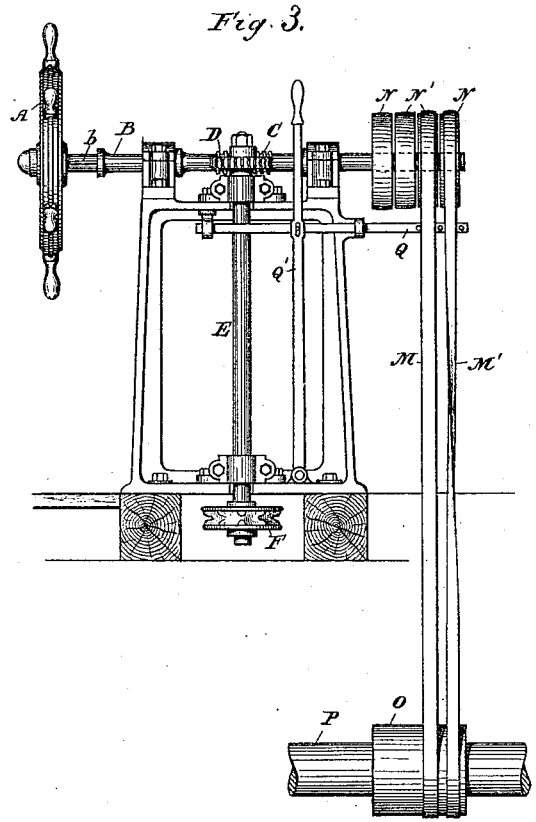

UNITED STATES PATENT OFFICE.

WILLIAM THOMSON, OF GLASGOW, SCOTLAND.

STEERING MECHANISM.

SPECIFICATION forming part of Letters Patent No. 465,896, dated December 29, 1891.

Application filed August 28, 1890. Serial No. 363,346. (No model.) Patented in England June 27, 1889, No. 10,429.

*To all whom it may concern:*

Be it known that I, WILLIAM THOMSON, a citizen of the United Kingdom of Great Britain and Ireland, residing at Smith Street, Kinning Park, Glasgow, in the county of Lanark, Scotland, have invented new and useful Improvements in Steering Mechanism Used on Board Ship, (which have not been patented in any country except Great Britain and Ireland by Letters Patent dated the 27th day of June, 1889, No. 10,429;) and I do hereby declare that the following is a full, clear, and exact description of the invention, which will enable others skilled in the art or manufacture to which it relates to make and use the same.

This invention has for its object to utilize power derivable from the propeller or paddle shafts of steamers for operating steering-gear, pumps, winches, windlasses, and like gear on board ship. I obtain the requisite power from the propeller-shaft or paddle-shaft or from any other shaft operated by the driving-engines through shafting and gearing which are put into action by means of friction or other clutches or like mechanism.

In the accompanying drawings, which illustrate my invention, Figure 1 is an elevation and Fig. 2 a plan showing one arrangement for operating the steering-gear from the propeller-shaft or paddle-shaft of a steamer; and Fig. 3 shows a modification of the same as adapted for operating the gear by belting from the propeller-shaft.

The steering-gear employed may be of any well-known construction, such as that represented in the drawings, in which the hand-wheel A is on a shaft B, having on it a worm or screw C, gearing with worm-wheels D on vertical shafts E, whereon are pulleys F, round which the rudder-chains are passed. The hand-wheel is in the present instance fitted loosely on the shaft B, but is adapted to be made fast thereon by a cone-clutch $b$ or like means, so that the hand-wheel may be used to operate the gear when desired.

For operating the steering-gear from the propeller-shaft or the paddle-shaft of a steamer an arrangement such as that represented at Fig. 3 may be conveniently employed. In this case open and cross belts M M' are passed over fast and loose pulleys N N' on the shaft B of the steering-gear and driven from a drum O on the propeller or paddle shaft P, the belts being shifted as required to operate the steering-gear in either direction by means of belt-forks Q and a hand-lever Q'. I prefer, however, to employ the arrangement shown at Fig. 1, in which the shaft I is driven by gearing R R' from the propeller or paddle shaft P.

To insure that the rudder will not be sent too far to port or starboard, I attach to the clutch-lever H a link H', having at its end a bent arm which is acted on by a pin on the rotating wheel D to throw the clutch out of gear when a revolution or part of a revolution of the said wheel has been completed and the rudder is over at its greatest angle, the rudder-operating gear being thus automatically put out of action. A dial $H^2$ and pointer $h^2$, showing the position of the rudder, are also provided.

The steering-gear represented in the drawings may be replaced by pumps, winches, or like gear to be operated by power obtained as above described.

Having now described my invention, what I desire to claim, and secure by Letters Patent, is—

1. In a device for steering ships, the combination, with the shaft B, provided with fast and loose pulleys N N', of the shaft P, drum O, mounted thereon, open and cross belts M M', passing over the pulleys before mentioned and driven from said drum O, and belt-forks Q and hand-lever Q' for shifting said belts, substantially as and for the purpose specified.

2. In a device for steering ships, the combination, with the rudder, rudder-chains, and the hereinbefore-described devices for operating the same, of means for preventing too great a movement of the rudder, consisting of clutch-lever H, mounted upon the frame and engaging by one end the shaft B, link H', attached thereto and provided with a bent arm, upon which acts the pin on rotating wheel D, the latter being mounted on shaft E, and a dial and pointer for indicating the position of the rudder, substantially as and for the purpose specified.

In witness whereof I have hereunto set my hand and seal this 20th day of May, 1890.

WILLIAM THOMSON. [L. S.]

Witnesses:
    WALLACE FAIRWEATHER,
*C. E. Fel. Inst. Patent Agents, 625 Vincent Street, Glasgow.*
    JNO. ARMSTRONG, Jr.,
*Clerk, 625 Vincent Street, Glasgow.*